UNITED STATES PATENT OFFICE.

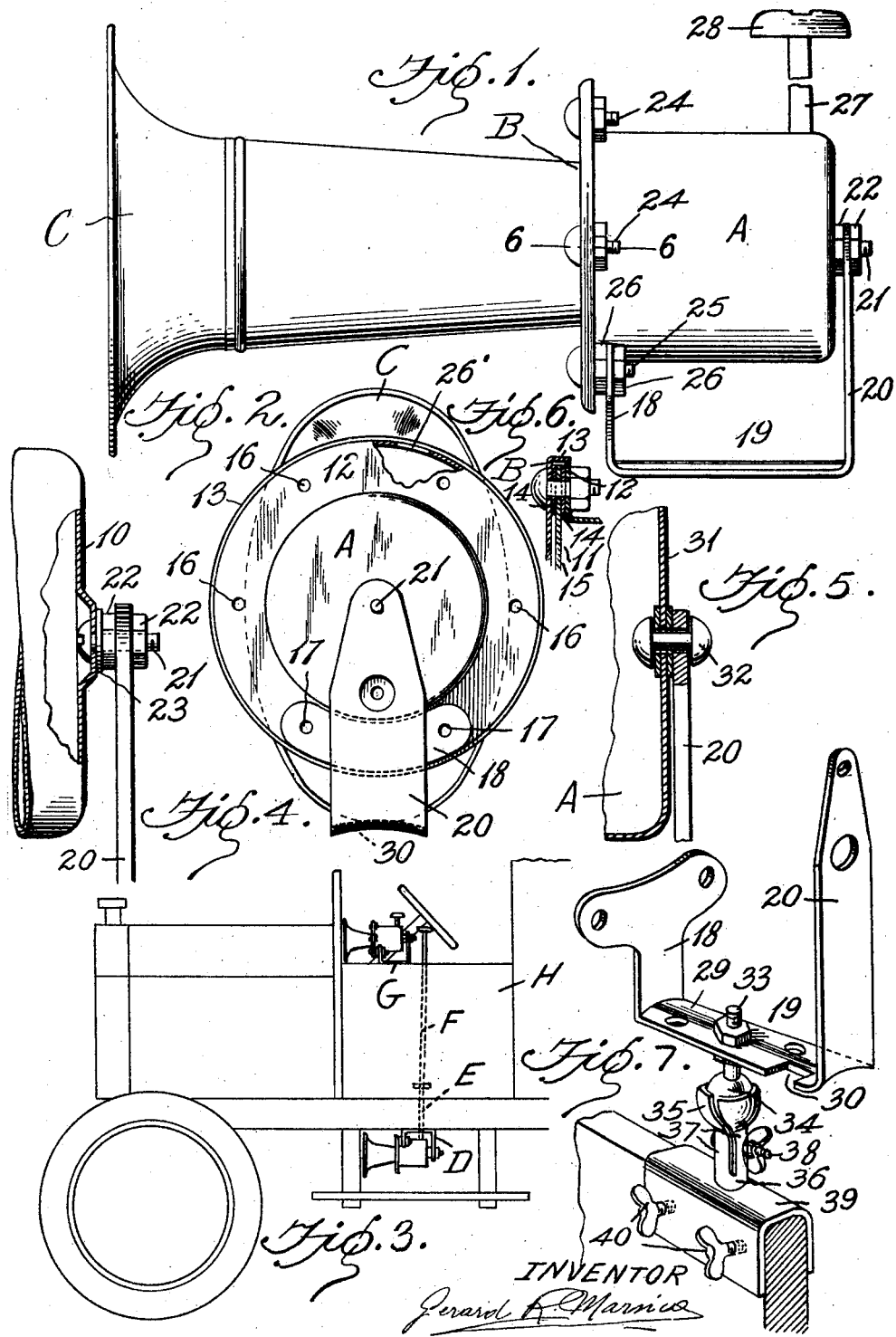

GERARD R. MARSICO, OF BROOKLYN, NEW YORK, ASSIGNOR TO PURITON MANUFACTURING CORPORATION, OF BROOKLYN, NEW YORK, A CORPORATION OF NEW YORK.

HORN-SHELL AND BRACKET.

1,391,688. Specification of Letters Patent. Patented Sept. 27, 1921.

Application filed November 8, 1919. Serial No. 336,701.

*To all whom it may concern:*

Be it known that I, GERARD R. MARSICO, a citizen of the United States, and resident of Brooklyn, in the county of Kings and State of New York, have invented certain new and useful Improvements in Horn-Shells and Brackets, of which the following is a specification.

This invention relates to horn shells and brackets and has for its primary object the provision of a shell structure and mating bracket therefor; one of said parts coöperating with the other to permit the shell to be operatively accommodated by respectively different parts of an automobile or vehicle, enabling the projector or sound amplifier of the horn to be mounted to face directly forward so that the full value of the sound emitted from the horn will be realized, the said mating parts of the structure also serving to permit of their relative adjustments whereby the actuating means of the horn can be arranged in convenient reach of the operator.

Various makes of automobiles and vehicles do not permit of an effective application thereto of warning signals of the sound producing type so that the plunger or actuator for the sounding mechanism can be arranged in convenient reach of the driver of the vehicle and the sound projector or amplifier mounted to face directly forward. In carrying my invention into practice, I have combined a novel form of horn shell with a novel form of supporting bracket, so that, regardless of the place where the horn is mounted, the actuator or plunger thereof will extend toward the driver where it can be conveniently reached by the hand or foot when a sounding of the signal is desired. The salient feature of the invention resides in providing a number of instrumentalities, all of which are arranged to mate and co-act with each other so that the horn may be mounted for substantially universal or unlimited adjustments to thus overcome the inconsistencies and trouble heretofore experienced when mounting the structure upon the vehicle.

The invention is particularly useful in connection with horns or signals of the diaphragm type, and aside from the useful features of construction attributed to the arrangement and combination of parts as hereinbefore referred to, I have assembled with such parts, means for holding them in their intended positions of adjustment and for also clamping the diaphragm between the shell sections of the horn casing.

With these ends in view this invention consists in the details of construction and combination of elements hereinafter set forth and thence specifically designated by the claims.

In order that those skilled in the art to which this invention appertains may understand how to make and use the same, the construction and operation will now be described in detail, referring to the accompanying drawings, forming part of this specification, in which:

Figure 1 is a side view of my improved bracket and shell.

Fig. 2 is an end view thereof with parts in section.

Fig. 3 is a conventional illustration showing different manners of mounting the horn upon an automobile.

Fig. 4 is a side view of a portion of the back shell and a portion of the bracket, with parts in section.

Fig. 5 is a view similar to Fig. 3 showing a slightly modified form of the invention.

Fig. 6 is a section on line 6—6 of Fig. 1.

Fig. 7 is a perspective view of another form of the invention.

In the drawing, A represents the back shell of a hand actuated signal; B the front shell, and C the projector or amplifier, all associated with one another to constitute a casing for the internal mechanism of the horn. These parts, except for certain details of construction are of the type usually employed in this class of signals. While I have described that my invention is primarily intended for use in connection with hand actuated signals, it will of course be understood that such reference is only made so that the full advantages of the structure will be properly illustrated and appreciated. In some instances certain parts of the structure which I will describe hereinafter can be used to an advantage in connection with electrically operated or motor controlled signals, in so far as establishing a proper position of the sound projector or amplifier may be concerned.

The back shell A is provided with a crown wall 10. The front of the shell is open as at 11 in Fig. 6 and it is provided with a laterally disposed annular flange 12, the outer edge of which is overlapped by a flange 13 on the front shell B, the latter carrying the projector or amplifier C. Between the flange 12 and said front shell B are washers 14—14 and a diaphragm 15. The diaphragm is intended to be vibrated or displaced by any suitable well known sounding mechanism, not shown.

The flange 12 is provided with an annular series of perforations 16, equi-distantly spaced apart in conformation with similar perforations 17—17 in an angular branch or arm 18 of a bracket 19. The perforations 16 are adapted to be arranged in pairs with respect to the perforations 17 in the branch or arm 18. A second longer arm or branch 20 forms part of said bracket and the free terminal is arranged at the center of the crown 10. In one embodiment of the invention, the free end of the arm 20 is connected with the crown 10 by a bolt 21, the latter positioned at the center of the crown and provided with clamping nuts 22—22 between which the free end of said arm 20 is positioned and secured. A washer 23 is disposed directly between the crown 10 and the adjacent nut 22. From this construction it is seen that the series of perforations are arranged concentric with said bolt 21 so that when the nuts 22—22 are loosened, the bracket can be turned to bring the perforations 17 in registration with any set, consisting of two of the perforations 16, according to the adjustment desired. The back shell is secured to the front shell by bolts 24 whereby said shells are secured together and the diaphragm clamped therebetween. Similar bolts 25 are engageable with the front shell B and adapted to be passed through any of the perforations 16 and also engaged in the perforations 17. All of the described bolts 24 and 25 are interchangeable in the several perforations to permit the bracket to be extended in various radial positions with respect to the supporting or pivotal bolt 21. The bolts 25 are provided with clamping nuts 26—26 between which the short arm 18 of the bracket is sandwiched, the forwardly lying nuts being arranged in clamping contact with the adjacent face of the flange 12 on the back shell A.

The back shell is provided with a plunger receiving opening 26' in which the plunger 27 is adapted to reciprocate. This plunger is of the type whereby when its knob 28 is depressed by hand of foot, the sounding mechanism of the horn will be influenced or controlled. In order to permit a maximum range of adjustment of the bracket around the back shell A, the connecting body portion 29 of the bracket is recessed at one side as at 30 in Figs. 4 and 7, the recess being adapted to register with the guide opening 26' when the bracket is turned to the position D in Fig. 3. In this position of the bracket it may be secured beneath the floor of an automobile so that a small foot plunger E may be associated with the horn, or a long hand actuated plunger F, the latter terminating near the steering wheel of the automobile or at some other suitable place where it may be conveniently reached by the driver. In the position G of the bracket, the horn may be mounted upon the upper edge of the door H as shown in Fig. 3. In one of these positions of the horn, the bracket underlies the back shell A. In the other position the bracket overlies said back shell. These are merely illustrative of amplitudes of adjustment of the bracket so that the projector will always face forward and the actuating plunger disposed in a correct working position.

In the form of the invention shown in Fig. 5 of the drawings, the crown 31 of the back shell is connected with the arm 20 of the bracket 19 by a rivet 32, allowance being made for free turning movement of the bracket around the shell A, when the front end of the bracket is uncoupled from structure.

In the form shown in Fig. 7, the bracket 19 is identical with the one previously mentioned, but in this instance, the portion 29 thereof is clamped to a bolt 33, the lower end of which is ball shaped as at 34 and the same is mounted in the split socket 35. Said socket is formed as a part of a post 36 which is provided with relatively separable clamping sections 37—37. A clamping bolt 38 is operatively connected with said sections 37—37 so that the walls of the socket 35 can be brought into effective clamping engagement with the ball 34 to hold the bracket in any of its angular positions of adjustment. The post 36 is carried by a U-shaped clip 39 which may be positioned over the edge of a door or like part and secured thereto by bolts 40 or the like.

While I have herein fully shown and described, and have pointed out in the appended claims certain novel features of construction, arrangement, and operation which characterize my invention, it will be understood by those skilled in the art that various omissions, substitutions, and changes in forms, proportions, sizes, and details of the device, of the materials used, and of their operation may be made without departing from my invention.

What I claim as new is:

1. In a structure of the class described, a back shell, a front shell, a bracket mounted to turn upon said back shell and secured thereto against axial movement thereof, a branch formed on the bracket, and removable fastenings engageable with the front and back shells respectively for securing the same together and engageable with said branch at a plurality of points to positively secure the bracket against turning movement, the back shell having a plunger passage therein, the bracket having a recess adapted to register with said passage in one position of adjustment of the bracket.

2. The combination with a horn casing including a plunger guide passage therein, of a recessed bracket turnable on the casing, the recess of the bracket adapted to register with the guide passage when the bracket is turned to one position, and means for holding the bracket against turning movement.

Signed at Brooklyn, in the county of Kings and State of New York, this 31st day of October, A. D. 1919.

GERARD R. MARSICO.